United States Patent Office 3,239,467
Patented Mar. 8, 1966

3,239,467
METAL CLEANING AND TREATING COMPOSITIONS
Richard J. Lipinski, Erie, Pa., assignor to Lord Corporation, a corporation of Pennsylvania
No Drawing. Filed Feb. 15, 1962, Ser. No. 173,347
10 Claims. (Cl. 252—144)

The present invention relates to a novel composition for cleaning metal surfaces, and, in a preferred embodiment, to such a composition also adapted for the preliminary treatment of certain metal surfaces prior to bonding to an organic adhesive or coating composition. The invention also relates to a method of cleaning metal surfaces to remove oleaginous materials therefrom, and in a preferred embodiment, to a method of cleaning and treating certain metal surfaces to enhance bonding between such surfaces and sequently applied organic adhesives or coating compositions.

Metal bodies, such as sheets, plates, tubes and the like, as received from the manufacturer, contain on the surfaces thereof a thin film of oleaginous material resulting from the shaping, forming or other handling thereof by the manufacturer. Thus metal-working lubricants used during the rolling, drawing, cutting, shaping and other metal-working operations leave a film of oleaginous material which may be of a vegetable oil or mineral oil base. Dirt often adheres to the metal surface, especially to the oleaginous film. Oxides are also often associated with the metal surface. Likewise, the stenciling of the manufacturer's name and other data on the metal bodies leave stencil marks, and often smudges, of oleaginous based materials. Such metal bodies must be subjected to a cleaning treatment to remove the oleaginous film, dirt, oxide and ink before the metal surface can be subsequently utilized, such as by being bonded to another body by means of an organic adhesive or by having an organic coating composition applied thereto. The conventional solvent degreasing systems are not as efficient as is desired. Moreover, except for the removal of the oleaginous film, they do not particularly enhance subsequent bonding of the metal surface to organic adhesives and coating compositions.

It is the principal objection of the present invention to provide a novel improved composition for the cleaning of metal surfaces.

Still another object of the present invention is to provide a novel improved composition for the removal of oleaginous films from the metal surfaces.

A further object is to provide a novel improved composition for the removal of oleaginous films and oxide from metal surfaces.

A specific object of the present invention is to provide a novel improved composition for cleaning metal surfaces and, in addition, for treating the metal surface to enhance the bonding thereof to subsequently applied organic adhesives and coating compositions.

Other objects, including a novel method for cleaning metal surfaces, and, in a preferred embodiment, for enhancing the bondability of certain metal surfaces to subsequently applied organic adhesives and coating compositions, will become apparent from a consideration of the following specification and the claims.

The novel composition of the present invention is based upon a combination of a defined glycol ether and 1,2-bis($\beta$-chloroethyoxy)ethane in certain proportions. The 1,2-bis($\beta$-chloroethoxy)ethane is commonly referred to as triglycol dichloride, and the latter term will be used herein and in the claims for convenience. The composition is advantageously used in conjunction with water, but may be marketed and used without any water or may be marketed without the full amount of water desired, the user adding additional water to the composition prior to use. In one embodiment of the invention, the composition will also contain an acid, preferably an oxidizing acid, to provide an acid pH to the composition. In the preferred embodiment of the invention, the oxidizing acid selected will be a nitrosulfonic acid. The composition may be marketed and/or used in either liquid or paste form, in the latter embodiment conventional thickening agents being included in the composition to provide a paste consistency.

The composition will comprise as a major constituent, a glycol ether having the formula $$HO-(CH_2)_n[-O-(CH_2)_n]_x-OR$$

where $x$ is selected from 0, 1 and 2, $n$ is selected from 2 and 3 and R is an alkyl group containing from one to six carbon atoms, and as a minor constituent, triglycol dichloride.

As between the glycol ether and triglycol dichloride, the former will generally be present in an amount between about 80 and about 99%; the latter in an amount between about 1 and about 20%, said percentages being by weight based on the combined weight of the glycol ether and triglycol dichloride.

Referring specifically to the glycol ether, it will be seen from the foregoing formula that it may be a lower alkyl ether of ethylene glycol, propylene glycol, polyethylene glycol and polpropylene glycol, there being no more than three ethylene or propylene groups in the stated polyethylene and polypropylene glycols. Preferably, the glycol ether selected will have a total number of carbon atoms of no more than 12. The alkyl ether group may contain up to 6 carbon atoms, and such groups are methyl, ethyl, propyl, butyl, amyl and hexyl. Examples of such glycol ethers are: ethylene glycol mono n-butyl ether, ethylene glycol monomethyl ether, propylene glycol monomethyl ether, diethylene glycol monomethyl ether, diethylene glycol mono-n-butyl ether, diethylene glycol monohexyl ether, dipropylene glyco monomethyl ether, dipropylene glycol mono-n-butyl ether, diproroylene glycol monohexyl ether, triethylene glycol monomethyl ether, triethylene glycol monopropyl ether, triethylene glycol mono-n-butyl ether, tripopylene glycol monomethyl ether, and the like. Mixtures of such glycol ethers may be employed, such as a mixture of propylene glycol monomethyl ether, dipropylene glycol monomethyl ether and tripropylene glycol monomethyl ether.

With respect to the triglycol dichloride, this compound is, as stated, chemically defined as 1,2-bis($\beta$-chloroethoxy)ethane. The material has a solubility in water at 20° C. of only 1.89%. However, in the presence of the glycol ether in the amount specified, triglycol dichloride is readily miscible in water. Hence, water may be added to the composition of the invention, and amounts up to 4 parts by weight of water per part of combined glycol ether and triglycol dichloride have been found to be particularly satisfactory. Preferably, an amount of water equal to at least .25 part by weight thereof per part by weight of the combined glycol ether and triglycol dichloride is employed in utilizing the composition.

If desired, a small amount of a wetting agent may be employed in any of the compositions of the invention, and this may be any surface active agent compatible with the system. It is normally preferred to employ a nonionic surface active agent. Particularly satisfactory surface active agents for use in the present compositions are the condensation products of ethylene oxide and alkylated phenols, especially tertiary-octyl phenol condensate with ethylene oxide, and containing from 1 to 30, preferably from about 9 to about 13, ethylene oxide units.

The compositions of the present invention may be employed at widely different temperatures. In general, the higher the temperature, the faster is the treatment. Temperatures ranging from room temperature, or below down to 50–60° F., up to the boiling point of the composition may be used.

As illustrated in the following Table I, the above-described composition consisting essentially of the glycol ether and the triglycol dichloride in the stated proportions, removal of substantially all the oleaginous lubricant film (100% wettability) is one of the primary features of the present invention since a treatment that removes only 90%, or less, of such film leaves significant areas on the metal surface which interfere with satisfactory bonding of subsequently applied adhesives or coatings. The notations under the column entitled "Contaminants Retained" were obtained visually from the treated strips. The results are set forth in the following table:

*Table I*

Composition (parts/weight/100)*

| Composition | Ethylene Glycol n-butyl ether | Triglycol dichloride | Immersion Time, Minutes | Wettability | Contaminants Retained |
|---|---|---|---|---|---|
| I | 100 | 0 | 45 | Incomplete, 60–70%. | Stencil ink and lubricant. |
| II | 99 | 1 | 32 | Complete, 100%. | None. |
| III | 98 | 2 | 26 | ----do-------- | Do. |
| IV | 95 | 5 | 5 | ----do-------- | Do. |
| V | 90 | 10 | 5 | ----do-------- | Do. |
| VI | 80 | 20 | 36 | ----do-------- | Do. |
| VII | 70 | 30 | 45 | Incomplete, 50–75%. | Stencil ink and soils. |
| VIII | 50 | 50 | 45 | ----do-------- | Do. |
| IX | 30 | 70 | 45 | ----do-------- | Do. |
| X | 20 | 80 | 45 | ----do-------- | Do. |
| XI | 5 | 95 | 45 | ----do-------- | Do. |
| XII | 0 | 100 | 45 | ----do-------- | Do. |

*Each composition contained 1% nonionic wetting agent (tertiary-octyl phenol condensate with ethylene oxide averaging 9–10 ethylene oxide groups) based on the total solution weight.

is an improved all-round cleaning material as compared to either of the components alone. In the following Table I tests were employed to measure wettability (degree of removal of oleaginous film) and contaminants retained (degree of removal of stencil ink and soil). The data were obtained by immersing in the designated baths, two 2024–T3 aluminum strips (3" x 4" x .063") containing excessive lubricant and soils and heavy stencil ink lettering. Before treatment the strips couldn't be wet at all with water. The baths were held in an ultrasonic cleaning tank at a frequency of 20–22 kilocycles. The specimen strips were held in the baths, maintained at 75±3° F., until visibly clean or, at the most, until 45 minutes had elapsed. After the designated time, the strips were removed from the bath and, without rinsing, were dried in an air-circulating oven for twenty minutes at 165° F. They were examined visually for the amount of surface wetted with the water, that is the amount of surface remaining wet 20 seconds after the application of water. 100% wettability means that the strip held a continuous film of water for at least 20 seconds. The The accelerating effect of elevated temperatures during treatment are illustrated in the following Table II wherein the procedure was the same as used in connection with Table I except that the baths were maintained at a temperature of 158±2° F., the maximum time of immersion was 30 minutes, and no ultrasonic vibration was used.

*Table II*

Composition (parts/weight/100)*

| Composition | Ethylene Glycol n-butyl ether | Triglycol dichloride | Immersion Time, Minutes | Wettability | Contaminants Retained |
|---|---|---|---|---|---|
| XIII | 100 | 0 | 30 | Incomplete, 75–80%. | Stencil ink, lubricants and soils. |
| XIV | 80 | 20 | 30 | Complete, 100%. | Stencil ink—one side only. |
| XV | 50 | 50 | 30 | Incomplete, 60–70%. | Soils and stencil ink. |
| XVI | 20 | 80 | 30 | ----do-------- | Do. |
| XVII | 0 | 100 | 30 | Incomplete, 50–70%. | Do. |
| XVIII | 95 | 5 | 12 | Complete, 100%. | None. |

*Each composition contained 1% nonionic wetting agent (tertiary-octyl phenol condensate with ethylene oxide averaging 9–10 ethylene oxide groups) based on the total weight of solution.

The composition described above comprising the glycol ether and triglycol dichloride, with or without water, may be used to clean the surface of any metal since they are inert to the metal itself.

In accordance with a preferred embodiment of the present invention, an acid is included in the composition in an amount to provide a pH between about 0.5 and about 6, preferably between about 0.5 and about 3. While any acid compatible with the system may be used for this purpose, such as the common mineral acids like hydrochloric acid, phosphoric acid, and the like, it is preferred that the acid be an oxidizing acid, such as a nitrosulfonic acid, sulfuric acid, nitric acid, and the like. The composition of the present invention containing an acid is particularly useful where the metal surface contains an oxide film in addition to the oleaginous film. In general any metal surface may be treated with such an acid-containing composition, although as will occur to those skilled in the art the particular acid and amount thereof selected may be dictated by the particular metal to be treated.

In connection with the foregoing, it is preferred that the oxidizing acid be a nitrosulfonic acid. By the inclusion of a nitrosulfonic acid in the composition, the composition is useful not only for removing oleaginous material, dirt, stencil ink and oxide, but also for imparting a surface treatment to certain metals, particularly aluminum, stainless steel, and titanium, which enhances their bondability to subsequently applied organic adhesives and organic coating compositions. As far as the nitrosulfonic acid is concerned, it has been found that any sulfonic acid containing one or more nitro ($-NO_2$) groups will provide the improved results. Nitrosulfonic acids, as this term is used herein, include any acid having the general formula $R(SO_3H)_n(NO_2)_m$ where R is any organic radical, preferably an aromatic radical like benzene or naphthalene (including substituted derivatives thereof) and $n$ and $m$ are one or more.

Examples of nitrosulfonic acids that may be employed are: p-nitrobenzene sulfonic acid, m-nitrobenzene sulfonic acid, 2-chloro-5-nitrobenzene sulfonic acid, 2,4-dinitrobenzene sulfonic acid, 2-amino-5-nitrobenzene sulfonic acid, 5-nitro-o-toluene-2-sulfonic acid, 4-bromo-3-nitrobenzene sulfonic acid, 2,4-dinitronaphthyl-7-sulfonic acid, 6-amino-4-nitro-1-phenol-2-sulfonic acid, 5-amino-4-nitro-1-phenol-2-sulfonic acid, 3-nitro-4-hydroxylbenzene sulfonic acid, 3,5-dinitro-p-toluene sulfonic acid, 4,4'-dinitro-2,2'-stilbene disulfonic acid, 5-nitroanthraquinone sulfonic acid, and the like.

The use of nitric acid along with a nitrosulfonic acid is also advantageous, the former insuring a pH in the low part of the range, when desired.

When the composition contains a nitrosulfonic acid the proportions of the three main components will be (a) glycol ether, between about 50 and about 98%; (b) triglycol dichloride, between about 1 and about 20%, and (c) nitrosulfonic acid, between about 1 and about 30%, the percentages being by weight and based on the combined weight of the three stated components.

The liquid compositions of the invention may be applied to metal surfaces by dipping, spraying, brushing, wiping, or the like. Following treatment with the compositions, the adhering composition may be removed from the metal surface by rinsing with water, and the metal surface dried.

The following examples illustrate compositions containing a nitrosulfonic acid, triglycol dichloride and various glycol ethers in the form of a solution containing water in the pre-treatment of aluminum prior to bonding with an organic adhesive. In these examples, a composition is made as follows:

| | Parts by wt. |
|---|---|
| Glycol ether | 100 |
| Triglycol dichloride | 4 |
| Water | 100 |
| Ethylene oxide addend of t-octyl phenol averaging 9–10 ethylene oxide groups | 2 |
| 5-nitro-o-toluene sulfonic acid | 24 |

Various glycol ethers were employed as follows.

| Composition: | Glycol ether |
|---|---|
| XIX | Ethylene glycol mono-n-butyl ether. |
| XX | Ethylene glycol monomethyl ether. |
| XXI | Tripropylene glycol monomethyl ether. |
| XXII | Mixture of mono- di- and tripropylene glycol monomethyl ether. |

Strips (1" x 4" x .064") of 2024–T3 aluminum (about 4% copper, with traces of silicon, iron, manganese, magnesium, chromium and zinc, balance aluminum) clad with 1230 aluminum (99.3% pure aluminum with traces of silicon, iron, copper and manganese) and having a heavy film or lubricant on the surface thereof, are immersed for two minutes in the designated composition at 160° F. Upon removal, they are rinsed and dried. Several sets of strips are immersed in each bath. To one broad face of each of the strips (for a length of about ¾ of an inch from one end) is applied a curing catalyst-containing epoxy resin prepared by mixing 12 parts of diethylene triamine with 100 parts of epoxy resin. The coated strips are allowed to stand open for 90 minutes at room temperature. Each set of strips is then brought together with the adhesive therebetween to provide a ½" lap joint. About 30 p.s.i. pressure is applied and the assemblies are held for about 3 hours at 200° C. The assemblies are then removed from the oven and press and allowed to cool to room temperature.

The assemblies are then tested for shear strength on a Baldwin Tensile Tester and compared with control assemblies which have simply been degreased in trichloroethylene and wiped with acetone prior to bonding. The results are as follows.

*Table III*

| Composition: | Bond strength (p.s.i.) (average of 5 assemblies) |
|---|---|
| XIX | 3482 |
| XX | 2760 |
| XXI | 3494 |
| XXII | 2864 |
| Control | 1600 |

A particularly advantageous concentrate composition containing no water which may be used as such or may be mixed with water before use is as follows: ethylene glycol mono-n-butyl ether, 70 parts by weight; triglycol dichloride, 4 parts by weight; 5-nitro-o-toluene sulfonic acid, 24 parts by weight; and ethylene oxide addend of t-octyl phenol containing an average of 12 to 13 ethylene oxide units, 2 parts by weight. To this composition may be added from about 1 to about 4 parts of water per part of composition and sufficient nitric acid to insure a pH of 1–2.

The composition of the present invention may also be prepared in the form of a paste. In such case a thickening agent will be incorporated in the composition in an amount to impart a gel or paste-like (gel-like) consistency. Suitable thickening (gelling) agents are combinations of high molecular weight condensation products of polypropylene glycol and ethylene oxide with finely-divided siliceous material like diatomaceous earth, fuller's earth, airborne silica (uncompressed), and the like. In this connection, a particularly advantageous thickening agent is a combination of: (A) a mixture of about 90% of a condensation product of polypropylene glycol and ethylene oxide having a molecular weight of approximately 8000 and 10% of a similar condensation product having a molecular weight of approximately 1800, and (B) airborne silica having a particle size of approximately .007 to .02 micron. In such paste compositions, a minor amount of water is advantageously employed to provide the desired consistency.

The paste may be used as such and applied by wiping, brushing, or the like; or it may be admixed with water and employed in liquid form as by spraying, brushing, dipping or the like.

The following examples illustrate the present composition in the form of a paste and also illustrate the use of various nitrosulfonic acids. In accordance with these examples, the following formula is employed:

| | Parts by wt. |
|---|---|
| Ethylene glycol mono-n-butyl ether | 30.03 |
| Nitrosulfonic acid | 10.92 |
| Ethylene oxide addend of t-octyl phenol averaging 9–10 ethylene oxide groups | 2.37 |
| Triglycol dichloride | 1.82 |
| Water | 44.67 |
| Conc. nitric acid | 0.83 |
| Uncompressed airborne silica | 8.00 |
| Mixture of condensation products of polypropylene glycol and ethylene oxide, 90% having M.W. of approx. 8000 and 10% having M.W. of approx. 1800 | 1.00 |

In the various examples the following nitrosulfonic acids are used.

| Composition: | Nitrosulfonic acid |
|---|---|
| XXIII | 3-nitro-4-hydroxy benzene sulfonic acid. |
| XXIV | 2-amino-5-nitro benzene sulfonic acid. |
| XXV | 4-nitrotoluene-2-sulfonic acid. |
| XXVI | 2,4-dinitrobenzene sulfonic acid. |
| XXVII | 5-nitroanthraquinone sulfonic acid. |
| XXVIII | 4-bromo-3-nitrobenzene sulfonic acid. |
| XXIX | 5-nitro-o-toluene-2-sulfonic acid. |

Aluminum clad strips, as used in connection with compositions XIX through XXII above, are treated with each paste composition by spreading the paste thereon and permitting it to stand for 2½ hours. The strips are then rinsed with tap water and air dried. Strips are bonded to each other as in the case with compositions XIX through XXII above and in a like manner tested for bond strength and compared with a control which is simply degreased in trichloroethylene and wiped with acetone prior to bonding. The results are as follows.

Table IV

| Composition: | Bond strength (p.s.i.) (average of 4 assemblies) |
|---|---|
| XXIII | 2266 |
| XXIV | 2540 |
| XXV | 3720 |
| XXVI | 3806 |
| XXVII | 3760 |
| XXVIII | 3462 |
| XXIX | 3798 |
| Control | 2088 |

The following examples further illustrate the present composition in paste form and also illustrate the advantageous results obtained in the treatment of various stainless steels and titanium. In these examples, the following formula is employed:

| | Parts by wt. |
|---|---|
| Ethylene glycol mono-n-butyl ether | 20.02 |
| 5-nitrotoluene-2-sulfonic acid | 7.34 |
| Ethylene oxide addend of t-octyl phenol averaging 9–10 ethylene oxide groups | 1.58 |
| Triglycol dichloride | 1.21 |
| Water | 63.3 |
| Conc. nitric acid | 0.55 |
| Uncompressed airborne silica | 5.33 |
| Mixture of condensation products of polypropylene glycol and ethylene oxide, 90% having M.W. of approx. 8000 and 10% having M.W. of approx. 1800 | 0.67 |

Strips of various stainless steels and titanium, as set forth in the following table, 1″ x 4″ and having a thickness as also set forth in the table are treated with the thin paste composition by spraying the paste on the surface to a wet film thickness of about 10 mils. The films are allowed to air dry for about 2 hours at room temperature. The strips are then rinsed with water to remove adhering composition, and dried. The strips are then bonded and tested as in the case of compositions XIX through XXIX above, and compared with controls which are simply degreased in trichloroethylene and wiped with acetone prior to bonding. The results are as follows:

Table V

| Example | Metal | Thickness (Inches) | Bond Strength (p.s.i.), (Average of 3 Assemblies) | |
|---|---|---|---|---|
| | | | Control | Treated |
| XXX | Type 301 Stainless [1] | .040 | 2,842 | 3,972 |
| XXXI | Type 302 Stainless [2] | .050 | 2,516 | 2,976 |
| XXXII | Type 430 Stainless [3] | .025 | 2,650 | 3,392 |
| XXXIII | Titanium (Commercially pure). | .020 | 1,840 | 2,882 |
| XXXIV | Titanium Alloy [4] | .040 | 2,540 | 2,754 |

[1] Cr 16–18%, Ni 6–8%, C 0.15% max., Mn 2% max.
[2] Cr 17–19%, Ni 8–10%, C 0.15% max., Mn 2% max.
[3] Cr 14–18%, C 0.12% max. Mn 1% max.
[4] Ti 88–90%, C 0.2% max., Al 6%, Va 4%.

Modification is possible in the selection of particular combinations of materials as well as in proportions thereof without departing from the scope of the present invention.

I claim:
1. A composition for cleaning and treating aluminum, stainless steel and titanium surfaces to improve their bondability to organic coatings and adhesives consisting essentially of (a) between about 50 and about 98% of a glycol ether having the formula

$$HO-(CH_2)_n[-O-(CH_2)_n]_x-OR$$

where x is selected from the group consisting of 0, 1 and 2; n is selected from the group consisting of 2 and 3 and R is an alkyl group containing from 1 to 6 carbon atoms; (b) between about 1 and about 20% of triglycol dichloride, and (c) between about 1 and about 30% of a nitrosulfonic acid, said percentages being by weight based on the combined weight of said glycol ether, said triglycol dichloride and said nitrosulfonic acid.

2. The composition of claim 1 containing also water in an amount up to about 4 parts by weight per part by weight of said combination of glycol ether, triglycol dichloride and nitrosulfonic acid.

3. The composition of claim 1 having a pH between about 0.5 and about 3.

4. The composition of claim 1 wherein said nitrosulfonic acid is selected from the group consisting of 3-nitro-4-hydroxy benzene sulfonic acid, 2-amino-5-nitro benzene sulfonic acid, 4-nitrotoluene-2-sulfonic acid, 2,4-dinitrobenzene sulfonic acid, 5-nitroanthraquinone sulfonic acid, 4-bromo-3-nitrobenzene sulfonic acid and 5-nitro-o-toluene-2-sulfonic acid.

5. The composition of claim 1 wherein said glycol ether is ethylene glycol mono n-butyl ether, and wherein said nitro sulfonic acid is 5-nitro-o-toluene-2-sulfonic acid.

6. A composition in paste form for cleaning and treating aluminum, stainless steel and titanium surfaces to improve their bondability to organic coatings and adhesives consisting essentially of (a) between about 50 and about 98% of a glycol ether having the formula $$HO-(CH_2)_n[-O-(CH_2)_n]_x-OR$$

where x is selected from the group consisting of 0, 1 and 2, n is selected from the group consisting of 2 and 3 and R is an alkyl group containing from 1 to 6 carbon atoms; (b) between about 1 and about 20% of triglycol dichloride; (c) between about 1 and about 30% of a nitrosulfonic acid; said percentages being by weight based on the combined weights of said glycol ether, said triglycol dichloride and said nitrosulfonic acid; and wherein there is present, in an amount to provide a gel-like consistency, a combination of (A) a mixture of about 90% of a condensation product of polypropylene glycol and ethylene oxide having a molecular weight of approximately 8,000, and about 10% of a condensation product of polypropylene glycol and ethylene oxide having a molecular weight of approximately 1800, and (B) airborne silica having a particle size of approximately .007 to .02 micron.

7. The composition of claim 6 having a pH between about 0.5 and about 3.

8. The composition of claim 6 containing also water in an amount up to about 4 parts by weight thereof per part by weight of said combination of glycol ether and triglycol dichloride.

9. The composition of claim 6 wherein said nitrosulfonic acid is selected from the group consisting of 3-nitro-4-hydroxy benzene sulfonic acid, 2-amino-5-nitro benzene sulfonic acid, 4-nitrotoluene-2-sulfonic acid, 2,4-dinitrobenzene sulfonic acid, 5-nitroanthraquinone sulfonic acid, 4-bromo-3-nitrobenzene sulfonic acid and 5-nitro-o-toluene-2-sulfonic acid.

10. The composition of claim 6 wherein said glycol ether is ethylene glycol mono n-butyl ether, and wherein said nitro sulfonic acid is 5-nitro-o-toluene-2-sulfonic acid.

References Cited by the Examiner

UNITED STATES PATENTS

| | | | |
|---|---|---|---|
| 1,700,739 | 2/1929 | Klinger et al. | 252—143 XR |
| 2,221,968 | 11/1940 | Friedmann | 252—145 XR |
| 2,466,632 | 4/1949 | Borus | 252—118 |
| 2,684,339 | 7/1954 | Herron | 252—316 |
| 2,698,781 | 1/1955 | Meyer | 252—142 XR |
| 2,789,070 | 4/1957 | Copelin | 148—6.15 |
| 2,828,265 | 3/1958 | Van Strien | 252—89 |
| 2,945,778 | 7/1960 | Lipinski | 148—6.24 |
| 2,945,779 | 7/1960 | Lipinski | 148—6.24 |
| 2,969,328 | 1/1961 | Ellenson et al. | 252—171 XR |

FOREIGN PATENTS 7,264 of 1900 Great Britain.

OTHER REFERENCES

"Organic Chlorine Compounds" (1946), published by Carbide and Carbon Chemicals Corp., pp. 6 and 7.

"Pluronics for Home & Commercial Laundry Formulations" (1958), Wyandotte Chem. Corp., page 4 relied on.

ALBERT T. MEYERS, *Primary Examiner.*

JULIUS GREENWALD, *Examiner.*

J. T. YOUNG, W. E. SCHULZ, *Assistant Examiners.*